(12) United States Patent
Boutnaru

(10) Patent No.: US 10,586,055 B2
(45) Date of Patent: Mar. 10, 2020

(54) ELECTRONICALLY BACKING UP FILES USING STEGANOGRAPHY

(71) Applicant: PayPal, Inc., San Jose, CA (US)

(72) Inventor: Shlomi Boutnaru, Modiin (IL)

(73) Assignee: PAYPAL, INC., San Jose, CA (US)

( * ) Notice: Subject to any disclaimer, the term of this patent is extended or adjusted under 35 U.S.C. 154(b) by 292 days.

(21) Appl. No.: 15/797,890

(22) Filed: Oct. 30, 2017

(65) Prior Publication Data
US 2019/0130117 A1    May 2, 2019

(51) Int. Cl.
*G06F 21/60*      (2013.01)

(52) U.S. Cl.
CPC ............ *G06F 21/602* (2013.01); *G06F 21/60* (2013.01)

(58) Field of Classification Search
CPC ............. H04L 41/0668; H04L 41/0681; H04L 41/0816; G06F 21/602; G06F 21/60
See application file for complete search history.

(56) References Cited

U.S. PATENT DOCUMENTS

| | | | |
|---|---|---|---|
| 6,535,618 B1 * | 3/2003 | Rhoads | G06Q 20/341 |
| | | | 382/100 |
| 8,825,606 B1 * | 9/2014 | Zhang | G06F 21/568 |
| | | | 707/679 |
| 9,514,309 B1 * | 12/2016 | Mann | G06F 21/60 |
| 2003/0070075 A1 * | 4/2003 | Deguillaume | G06T 1/0042 |
| | | | 713/176 |
| 2006/0107056 A1 * | 5/2006 | Bhatt | G06T 1/0021 |
| | | | 713/176 |
| 2012/0155634 A1 * | 6/2012 | Baughman | G06T 1/0021 |
| | | | 380/28 |
| 2017/0180394 A1 * | 6/2017 | Crofton | H04L 63/145 |
| 2018/0018458 A1 * | 1/2018 | Schmugar | G06F 21/566 |

OTHER PUBLICATIONS

H. Patel, P. Dave 'Steganography technique based on DCT coefficients', International Journal of Engineering Research and Applications (IJERA), vol. 2, Issue 1, Jan.-Feb. 2012, pp. 713-717 (Year: 2012).*
M.M. Amin, M. Salleh, S. Ibrahim, M.R. Katmin and M.Z.I. Shamsuddin 'Information hiding using steganograpgy', 4th National Conference on telecommunication Technology Proceedings, IEEE, Shah Alam, Malaysia, pp. 21-25 (Year: 2003).*
Bhattacharyya, Souvik, et al., "A Survey of Steganography and Steganalysis Technique in Image, Text, Audio and Video as Cover Carrier", Journal of Global Research in Computer Science, vol. 2, No. 4, pp. 1-16 (2011).
Natarajan, Ramesh, "RAID 0, RAID 1, RAID 5, RAID 10 Explained with Diagrams", The Geek Stuff, http://www.thegeekstuff.com/2010/06/raid-levels-tutorial, 17 pgs. (2010).

* cited by examiner

*Primary Examiner* — Catherine Thiaw
(74) *Attorney, Agent, or Firm* — Haynes and Boone, LLP

(57) ABSTRACT

Steganography is leveraged to store additional data in the existing data on any given electronic storage. For example, a first request to store a first electronic file is received. Based on the first request, a determination is made as to whether one or more second electronic files meet one or more predefined criteria for being a carrier file for steganography. If the one or more second electronic files meet the one or more predefined criterion for being a carrier file, the first electronic file is electronically stored into the one or more second electronic files using steganography.

20 Claims, 8 Drawing Sheets

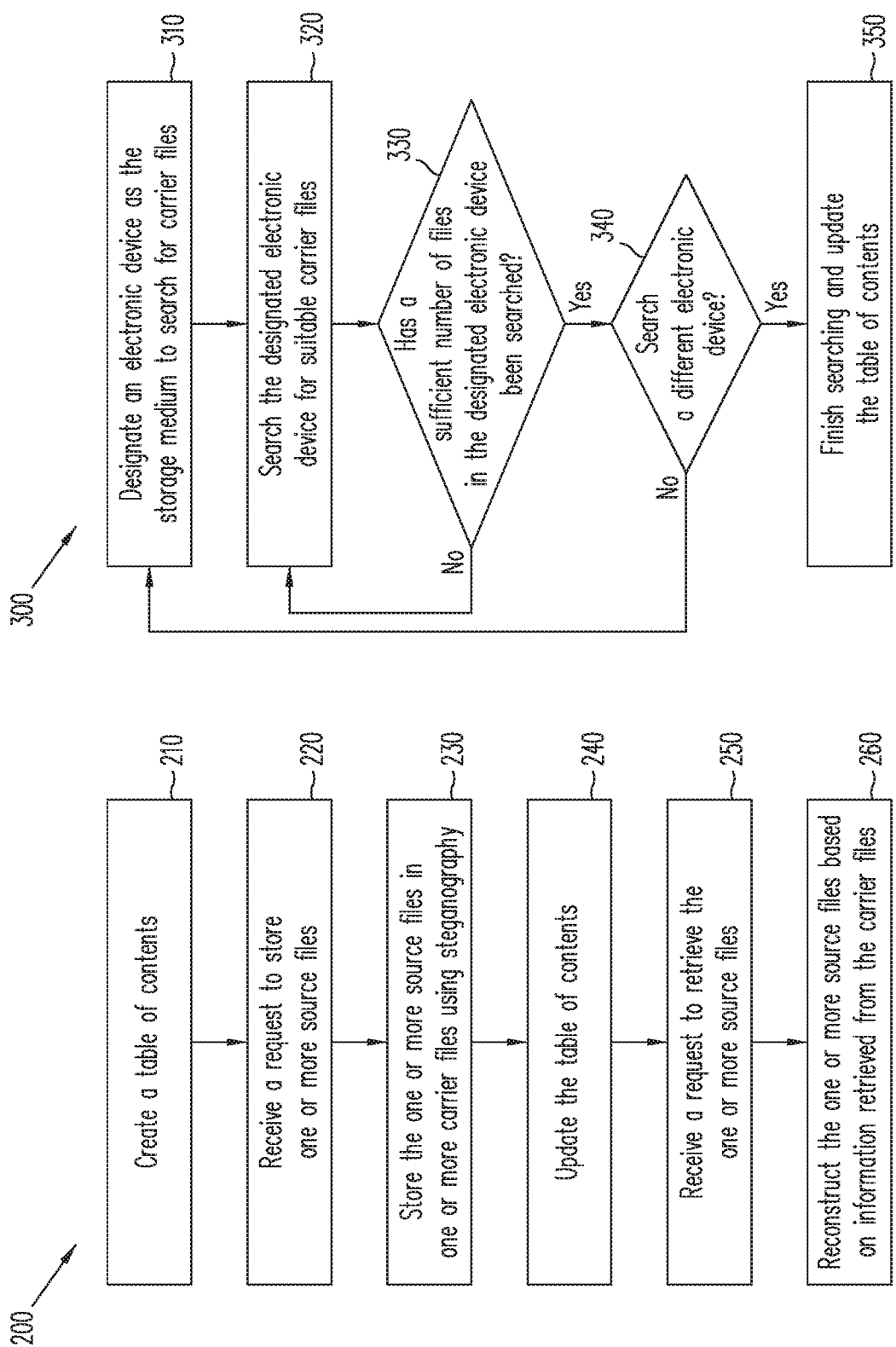

ELECTRONICALLY BACKING UP FILES USING STEGANOGRAPHY

BACKGROUND

Technical Field

The present disclosure generally relates to electronic storage of files, and more particularly, to leveraging steganography to store or back up electronic files.

Related Art

Rapid advances have been made in the past several decades in the fields of computer technology and telecommunications, and businesses and end users now engage in electronic activities more than ever. A plethora of electronic files may be created as a result of these electronic activities. For example, these electronic files may include emails, word processing documents, spreadsheets, pictures, videos, music, podcasts, e-books, etc. As more and more electronic files are created, the storage of the electronic files becomes an important concern. What is needed is an efficient, low cost, and yet secure way to electronically store or backup electronic files.

BRIEF DESCRIPTION OF THE DRAWINGS

FIGS. 3-7 are flowcharts illustrating various methods according to various aspects of the present disclosure.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As computing and communication technologies continue to advance, electronic file creation becomes increasingly more prevalent. For example, more and more people are turning to emails or electronic texting to communicate with one another instead of sending physical letters. As another example, rather than taking pictures with cameras that use film, users have turned to digital cameras and mobile telephones to electronically record pictures and/or videos. Similarly, digital music and e-books have mostly replaced conventional cassette tapes/CDs and paper books, respectively, as the preferred media of user consumption.

As more and more electronic files are being created, the electronic storage of these files has become an increasing concern. According to the various aspects of the present disclosure, electronic files are stored using steganography to leverage existing electronic files that are already stored on an electronic storage/medium, the details of which are discussed below.

Figure 1:
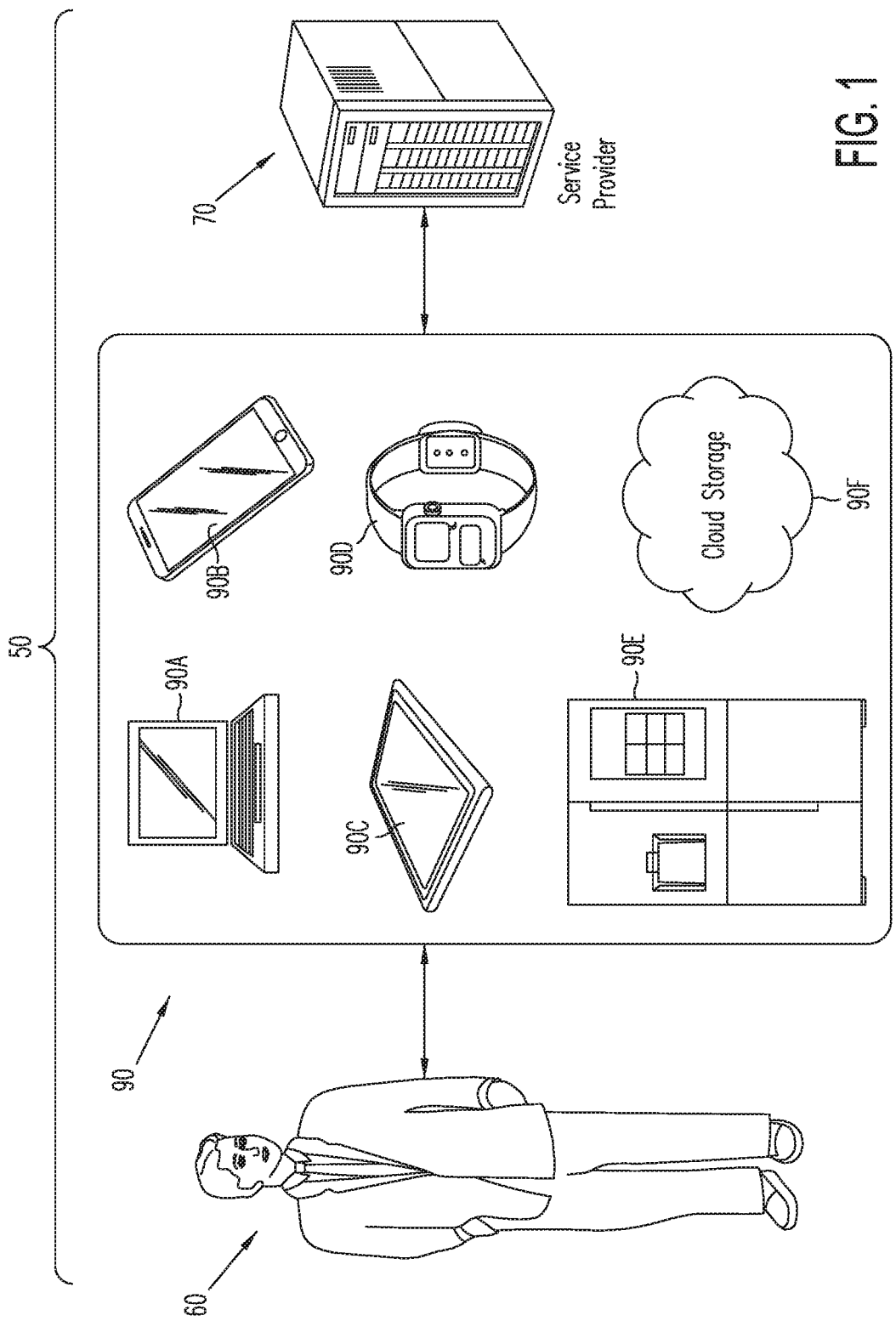
FIG. 1 is a simplified block diagram illustrating an infrastructure or system of using steganography to back up electronic data according to various aspects of the present disclosure.

FIG. 1 is a simplified high-level block diagram view of an infrastructure (or system) 50 that enables the storing or backup of electronic files using steganography. The infrastructure 50 includes a user 60, a service provider 70, one or more electronic devices 90, and a cloud storage 95. The user 60 may be a consumer or a worker for a business entity. The user 60 may generate electronic files (for example using the one or more electronic devices 90 discussed below) that can be stored or backed up electronically using steganography.

The service provider 70 may be an entity that develops a steganography engine that allows the electronic storing or backing up of files using steganography. In some embodiments, the service provider 70 may be an app developer, and the steganography engine may be implemented as (or within) a mobile app, for example an app that can be downloaded and installed via the APPLE APP STORE®, or GOOGLE PLAY®, etc. In other embodiments, the service provider 70 may be a software company that develops the steganography engine as part of a mobile operating system or desktop/laptop operating system, or as a program that can be installed on a mobile device or a desktop/laptop device. In other words, the functionalities provided by the steganography engine may be built into the mobile or desktop/laptop operating system, or the steganography engine may be downloaded as a software program and installed on a mobile or desktop/laptop device of the user 60. In some embodiments, the service provider 70 may be a financial institution or a third party payment provider, for example PayPal®, Inc. of San Jose, Calif., or a similar entity. The user 60 may also have an account with the service provider 70 in some embodiments.

To facilitate the ensuing discussions, the concept of steganography is briefly explained below. Generally, steganography involves the practice of concealing information within other data, but the concealment is performed in a way such that it is not immediately transparent or obvious, so as to avoid attracting attention or scrutiny. Used in the computer technology context, steganography may be used to conceal the information of one electronic file (referred to as a source file herein) into the content of another electronic file (referred to as a carrier file herein). The content of the carrier file is manipulated in a way to allow the information of the source file to be stored therein, without drawing attention to the fact that the carrier file itself has been altered.

One technique for implementing steganography is the "Least Significant Bit" (LSB) method. For example, an image file may be used as a carrier file for steganography. The image file may include a plurality of pixels, each one of which may be expressed as a plurality of binary digits (e.g., 101001101). The value of the binary digits may correspond to the color or hue of the pixel. The LSB method of steganography may intentionally change the least significant bit (e.g., the last digit) of each of the pixels, so that binary data may be stored in the pixels.

As a simplified example, suppose that the binary data of 1100 needs to be stored, and suppose that four image pixels are available to be used as carriers for steganography, where the pixels have original binary values of 101001100, 100011101, 111100000, and 100011001, respectively. In this example, the original least significant bit values of the four pixels are 0, 1, 0, and 1, respectively. By applying the LSB steganography method, the least significant bit values are changed into 1, 1, 0, and 0, respectively, so as to store the binary data value of 1100 into these four pixels. The altered pixels now have binary values of 101001101, 100011101, 111100000, and 100011000, respectively. Note that not all of the pixels' binary values are necessarily changed. If their original least significant bit binary value is the same as the binary value that needs to be stored, then no change needs to be made.

In this example above, the modification of the four pixels allows the binary data of 1100 to be stored therein, and as a result, two of the pixels' values (i.e., the first pixel and the last pixel) are altered. However, since each pixel has a relatively large binary value, the alteration of the least significant bit of the binary value does not change the overall color appearance of the pixel much at all. For example, if the original pixel represents a green color, then the altered pixel may contain a bit of blue, but the pixel still appears mostly green to the human eye. In other words, the relatively large binary value of the pixel, coupled with the small modification to the binary value, means that the overall change of the pixel (or of the image as a whole) is almost imperceptible to the human eye. Thus, a neutral observer may not be aware of the fact that information has been encoded or stored into the image file via steganography, but a user aware of this fact can extract the encoded information from the image file later.

Another technique for implementing steganography is known as the "F5" algorithm. The F5 algorithm typically uses a common image format such as JPEG as the carrier medium. Instead of replacing the LSBs of quantized Discrete Cosine Transformation (DCT) coefficients with the message bits, the absolute value of the coefficient is decreased by one if it needs to be modified. The F5 algorithm embeds message bits into randomly-chosen DCT coefficients and employs matrix embedding that minimizes the necessary number of changes to hide a message of certain length. In the embedding process, the message length and the number of non-zero AC coefficients (e.g., the AC coefficients of a DCT transform) are used to determine the best matrix embedding that minimizes the number of modifications of the cover image. Compared to the LSB technique, the F5 algorithm has better embedding efficiency and higher embedding capacity, as well as offering resistance against both visual and statistical attacks.

Of course, the LSB and F5 methods discussed above are just some examples of steganography, which may be implemented using a variety of techniques. Some of these additional steganography techniques are described in more detail in the article "A Survey of Steganography and Steganalysis Technique in Image, Text, Audio and Video as Cover Carrier" appearing in the Journal of Global Research in Computer Science, Volume 2, No. 4, April 2011, authored by Souvik Bhattacharyya, Indradip Banerjee, and Gautam Sanyal, the contents of which are hereby incorporated by reference in its entirety. For reasons of simplicity, other additional techniques of steganography are not discussed in detail herein.

Referring back to FIG. 1, the steganography engine (e.g., developed by the service provider 70) may be implemented on one or more of the electronic devices 90. As examples, the electronic devices 90 may include a computer 90A, a mobile telephone 90B, a computer tablet 90C, a peripheral device 90D (e.g., a wearable device such as a smart watch), a network-capable "smart" household appliance 90E (e.g., a refrigerator or a television set), or a cloud storage device 90F. These electronic devices 90 may communicate with each other, or with one or more computers of the service provider 70, under a suitable wired or wireless telecommunications protocol. While the devices 90A-90E may be located near the user 60 (e.g., at the user 60's home or work), the cloud storage device 90F may be located remotely from the user 60. The electronic devices 90A-90E may communicate with the cloud storage 90F to send and/or retrieve data to and/or from the cloud storage 95.

Figure 2:
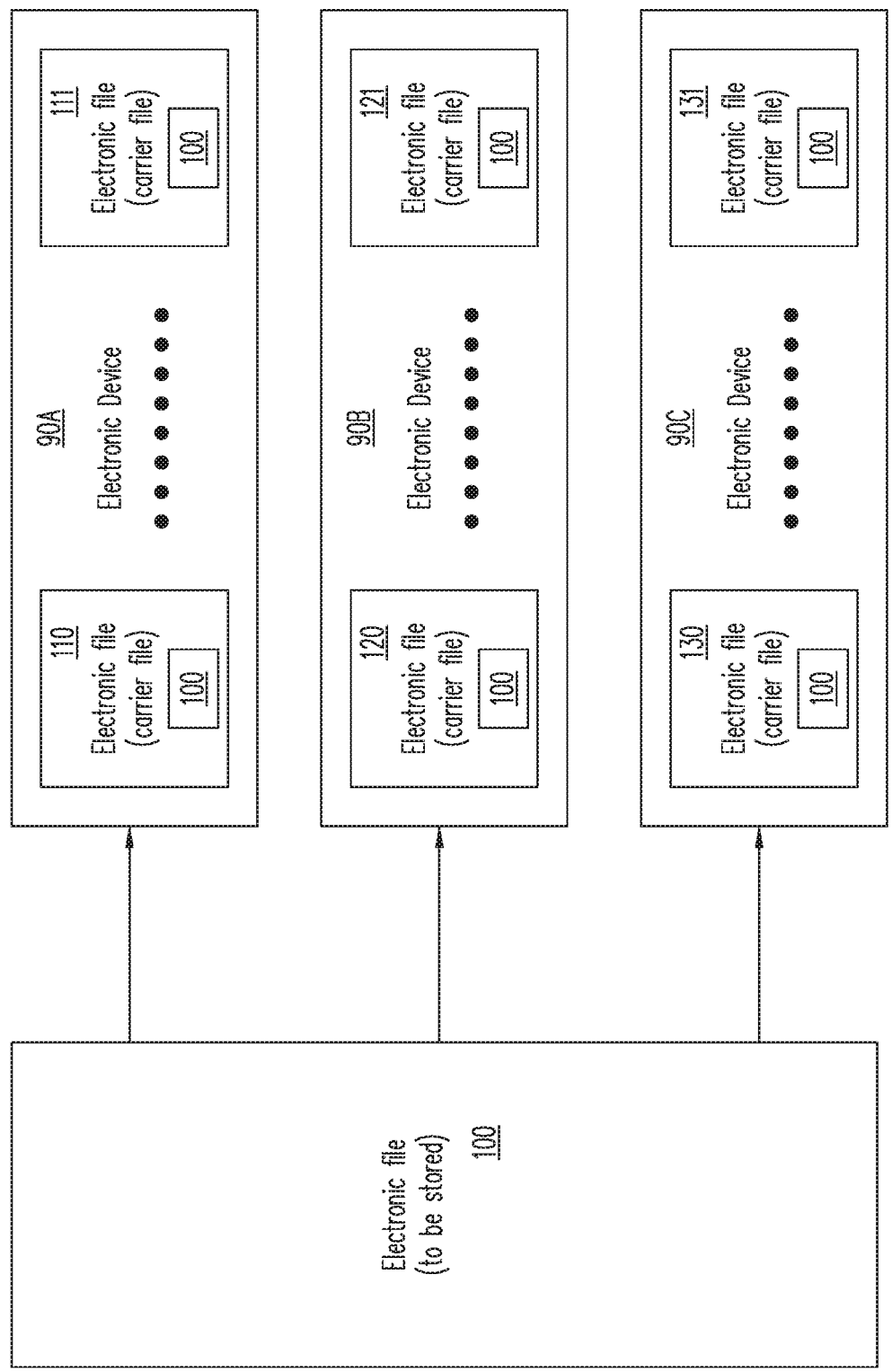
FIG. 2 is a block diagram block diagram that illustrates how an electronic file can be stored or backed up using steganography according to various aspects of the present disclosure.

FIG. 2 is a simplified block diagram that illustrates how an electronic file 100 (referred to as a source file) can be stored or backed up using steganography according to various aspects of the present disclosure. In various embodiments, the electronic file 100 may include an electronic file with visual content (e.g., a JPEG picture, a AVI video, etc.), audio content (e.g., an MP3 music file, a WAV podcast, etc.), and/or textual content (e.g., a MICROSOFT WORD® document, a spreadsheet, a presentation slide, an email, a text message, a spreadsheet, an e-book, etc.). In some embodiments, the electronic file 100 may be stored or backed up electronically at a request of the user 60. In other embodiments, the electronic file 100 may be stored or backed up electronically automatically without a specific involvement from the user 60.

The electronic file 100 may be stored or backed up electronically using steganography in any electronic device that has an electronic memory, for example any one of the electronic devices 90A-90F discussed above with reference to FIG. 1. As an example, electronic devices 90A, 90B, and 90C are illustrated as the suitable electronic devices for storing the electronic file 100 using steganography, though it is understood that the same concept applies to the devices 90D-90F. The electronic devices 90A-90C may each include one or more existing electronic files, which may serve as carrier files for storing the electronic file 100. As non-limiting examples, the electronic device 90A may include a plurality of electronic files such as electronic files 110-111, the electronic device 90B may include a plurality of electronic files such as electronic files 120-121, and the electronic device 90C may include a plurality of electronic files such as electronic files 130-131. The electronic files 110-111, 120-121, and 130-131 may be different types of files, such as video files, image files, audio files, etc.

Using steganography, the electronic file 100 may be stored or backed up into one or more of the files 110-111, 120-121, and/or 130-131. The storing or backing up of the electronic file 100 may be implemented using any steganography technique, for example the LSB technique discussed above. The electronic storing or backing up of the electronic file 100 via steganography offers improved security and/or privacy. For example, steganography allows the electronic file 100 to be stored in a secretive manner, such that its existence may not be readily apparent to a hacker or other users that should not otherwise have access to the electronic file 100. Since the existence of the electronic file 100 is not readily known, it is more difficult for hackers or the other users to gain access to the electronic file 100.

In some embodiments, the electronic storing or backing up of the electronic file 100 is implemented with redundancy. The redundancy may include a local level redundancy and/or a global level redundancy. For local level redundancy, multiple copies or instances of the electronic file 100 may be stored in the same electronic device. For example, a copy of the electronic file 100 may be stored in the electronic file 110 on the electronic device 90A, while another copy of the electronic file 100 may be stored in the electronic file 111 on the electronic device 90A. For global level redundancy, multiple copies or instances of the electronic file 100 may be stored on a plurality of different electronic devices. For example, a copy of the electronic file 100 may be stored in the electronic file 110 on the electronic device 90A, another copy of the electronic file 100 may be stored in the electronic file 120 on the electronic device 90B, and yet another copy of the electronic file 100 may be stored in the electronic file 130 on the electronic device 90C. Of course, local level redundancy and global level redundancy may be simultaneously implemented, such that multiple copies of the electronic file 100 are stored in different carrier files within the same electronic device, and similarly across multiple different electronic devices.

In some embodiments, the redundancy herein may employ a Redundant Array of Inexpensive/Independent Disks (RAID) technique. RAID works by storing data on multiple disks and allowing input/output (I/O) operations to overlap in a balanced way, though the data may still appear to an operating system as a single logical hard disk. The use of multiple disks increases fault tolerance. RAID may also involve disk mirroring or disk striping. In disk mirroring, identical data are copied onto more than one disk. In disk striping, each disk's storage space is partitioned into units ranging from a sector (512 bytes) up to several megabytes. The stripes of the disks may be interleaved and addressed in order. A brief summary for each of plurality of RAID levels is provided below, such as RAID 1, RAID 5, RAID 10, etc.

RAID 0: Minimum of 2 disks and has striped blocks, but no redundancy. RAID 0 offers the best performance but has no fault tolerance.

RAID 1: Minimum of 2 disks to duplicate the storage of data. No striping. Either disk can be read at the same time.

RAID 3: Uses striping across multiple disks and dedicates at least one disk to store parity information for the purposes of error checking and correction. Data recovery may be performed by calculating the exclusive OR of the information recorded on the other drives.

RAID 5: Minimum of 3 disks but typically involves 5 or more disks, and is based on block-level striping with parity. The parity information is striped across each drive, allowing the array to function even if one drive were to fail. The read and write operations can span multiple drives. RAID 5 offers good performance and good redundancy. Is better suited for heavy read operations, but not ideal for heavy write operations.

RAID 10: Minimum of 4 disks. RAID 10 is a combination of RAID 1 and 0. The data is mirrored, and the mirrors are striped (this is also referred to as a "stripe of mirrors". RAID 10 offers excellent redundancy since blocks are mirrored, as well as excellent performance since the blocks are striped.

Regardless of which RAID technique (or any other redundancy technique) is used herein, redundancy offers enhanced security and more robust protection of the electronic file 100. For example, if the electronic file 100 is only stored in a single carrier file, then if the carrier file is corrupted or inadvertently deleted, the electronic file 100 could become irretrievably lost. As local redundancy is implemented, the corruption or deletion of one carrier file will not affect the integrity of the electronic file 100, as the electronic file 100 can still be recovered from a different carrier file on the same electronic device. Global redundancy offers even more security and robustness, since even if one of the electronic devices is damaged or lost, the electronic file 100 can still be recovered from one or more of the carrier files located on the other electronic devices.

Redundancy also offers protection against ransomware. Ransomware may refer to malicious software programs that infiltrate the victim's computing devices, and then threaten to delete the contents of the infiltrated devices or otherwise block the user's access to the contents, unless the user pays a ransom to the perpetrator of the ransomware. Using the redundancy discussed above (especially global level redundancy), even if one of the electronic devices on which the electronic file 100 is stored is infected with the ransomware, the user may still retrieve a copy of the electronic file 100 from an unaffected electronic device.

It is also understood that an entirety of the electronic file 100 need not be stored into any single one of the carrier files. For example, the electronic file 100 may be divided or broken up into a plurality of portions or segments, and each divided portion may be stored into a respective one of the carrier files using a steganography technique. Local or global redundancy may also be used to implement the storing of the divided segments of the electronic file 100.

FIG. 3 is a flowchart illustrating a method 200 of storing electronic files using steganography according to embodiments of the present disclosure. One or more steps of the method 200 may be performed at least in part by a steganography engine discussed above. The method 200 includes a step 210, in which a table of contents is created. The table of contents maps out how (e.g., what steganography technique is used) and/or where (e.g., on which device and/or which carrier file) each source file (e.g., the electronic file 100 of FIG. 2) is stored. As an example, the table of contents created in step 210 may specify that multiple copies of the electronic file 100 (discussed above with reference to FIG. 2) are stored in the carrier files 110-111 on the electronic device 90A using the LSB steganography technique, as well as in the carrier files 120-121 on the electronic device 90B using a steganography technique other than LSB. An entry may exist in the table of contents for each of a plurality of stored source files.

In some embodiments, the table of contents is accessible by the user 60, for example upon being authenticated after entering the correct user credentials (e.g., username and password). In this manner, the user may know how and/or where each of the source files is stored. In other embodiments, the table of contents may be hidden from the user 60 and is only accessible by the software modules of the steganography engine.

The method 200 includes a step 220, in which a request to store one or more source files (e.g., the electronic file 100 discussed above) is received. This request may be generated by a software program or by a user such as the user 60. In some embodiments, the steganography engine provides a user interface, through which the user 60 may upload or otherwise specify the electronic files to be stored. For example, the user 60 may select the electronic source files from a source folder and "drag-and-drop" the selected electronic file into a destination folder that is reserved for files to be stored using steganography. In some embodiments, the user 60 may be allowed to specify the steganography technique that should be applied to store each of the electronic files. Furthermore, the user 60 may also be allowed to specify the exact electronic device(s) and/or the redundancy level for each of the electronic source files to be stored.

The method 200 includes a step 230, in which the source files of step 220 are stored electronically in one or more carrier files using steganography. Again, the storing of the electronic files is performed by the steganography engine, which may occur automatically "in the background" without additional involvement from the user 60.

The method 200 includes a step 240, in which the table of contents created in step 210 is updated. For example, the table of contents is updated to reflect how and/or where the electronic files discussed in steps 220 and 230 have been stored. It is understood that in some embodiments, the step 240 need not necessarily be performed after the step 230 but may instead be performed before the step 230, or concurrently with the step 230.

The method 200 includes a step 250, in which a request to retrieve the one or more stored source files is received. This request may be generated by a software program or by a user such as the user 60. For example, the one or more electronic files may be needed to execute another program, and thus the program may automatically make a call to the steganography engine when the one or more source files are needed. Alternatively, the user 60 may specifically send a request to the steganography engine to retrieve the one or more source files. For example, the one or more source files may include digital pictures, and the request in step 250 is issued when the user 60 wishes to view the pictures.

The method 200 includes a step 260, in which the one or more source files are reconstructed based on the information retrieved from the carrier files. In embodiments where local or global redundancy are used, the steganography engine may access any one of the carrier files (or a plurality of the carrier files, if each carrier file only stores a portion of the one or more source files) to retrieve the information that is stored in the accessed carrier files. Based on the retrieved information, and knowing which type of steganography technique has been used to encode the information into the carrier file(s), the steganography engine may then reconstruct the source file accordingly.

In theory, most, if not all, existing files in any given electronic storage medium can serve as carrier files for steganography. However, some of these files may be better candidates for serving as carrier files than others. Some aspects of the present disclosure involve determining which of these files qualify as more suitable candidates for serving as the carrier files. An example of this is discussed below with reference to FIG. 4, which illustrates an example method 300 of identifying suitable files for serving as carrier files in steganography.

The method 300 includes a step 310, in which an electronic device is designated as the storage medium to search for carrier files. For example, the user 60 may designate the electronic device 90A (e.g., a laptop computer) as the electronic device to search for carrier files. This means that the electronic files residing on the electronic device 90A will be searched subsequently to see if they qualify as a suitable carrier file for steganography. In some embodiments, the user 60 may be able to designate not only the electronic device, but also one or more specific directories or folders on the electronic device in which the search should be conducted. For example, the user 60 may designate "photos" folder in the C:\ drive of the electronic device 90A as the directory/folder in which the search for carrier files should be conducted.

The method 300 includes a step 320, in which the designated electronic device is searched for suitable carrier files. The searching in step 320 may include electronically scanning the files in the designated electronic device (or in one or more of the designated folders thereof) for one or more attributes. If the searched file has one of these attributes, it may be deemed suitable for being used as a carrier file.

According to the various aspects of the present disclosure, there may be a variety of attributes that could indicate whether the scanned file is suitable to serve as a carrier file. One example attribute is the frequency of modification to the scanned file. The steganography engine may determine how often the scanned file is modified, whether by the user or by another program running on the electronic device. The more frequently the scanned file is modified, the less suitable it is to be used as a carrier file. The rationale is that, information from the source file will need to be written or encoded into the existing data of the carrier file via steganography. However, if the carrier file is frequently modified (whether by the user or by another entity), that modification may corrupt the information of the source file written into the carrier file, which is undesirable. Alternatively, additional measures would have to be taken to prevent the inadvertent overwriting of the information encoded into the carrier file. Thus, it would be better if the carrier file is hardly ever modified, in which case the corruption of the source file information encoded therein via steganography is less of a concern.

In some embodiments, the steganography engine may assign a carrier file suitability score to the scanned file, where a higher score means that the scanned file is more suitable to be used as a carrier file, and a lower score means that the scanned file is less suitable to be used as a carrier file. In these embodiments, the more frequently the scanned file is modified, the lower the score it may receive, and vice versa. For example, the steganography may set a predefined threshold for the modification rate as once per year. If the scanned file is modified less than once per year, it may receive a carrier file suitability score greater than the predefined threshold, and thus may be used hereinafter as a carrier file. If the scanned file is modified more than once per year, it may receive a carrier file suitability score lower than the predefined threshold, and thus may not be used hereinafter as a carrier file.

It is also understood that different attributes may be evaluated for different types of files. For example, if the scanned file is a type of file that includes visual content—for example if the file is an image file (e.g., JPEG, GIF, BITMAP, etc.) or a video file (e.g., MP4, AVI, WMV, MOV, FLV, etc.)—the attribute may include whether the visual content contains one or more humans. In some embodiments, the determination of whether or not the visual content contains humans may be performed by scanning the visual content to look for human faces using image recognition techniques. For example, the scanning may look for a set of objects resembling human eyes, etc. If the visual content contains one or more humans, then the scanned file may be deemed not suitable (or less suitable) for being used as a carrier file. On the other hand, if the visual content contains no humans, then the scanned file may be deemed suitable (or more suitable) for being used as a carrier file. The rationale may be that most users value pictures/videos with humans in them, rather than pictures/videos that contain just inanimate objects. Since a carrier file being used for steganography will undergo some degree of alteration, it is more desirable to use files that are not highly valued by the user as the carrier files. Accordingly, the files where the visual content contains no humans may be better candidates for being used as carrier files. In another embodiment, determining whether a scanned file should or should not be used as a carrier file is based on user specific preferences or data. For example, if a user is known to value pictures or videos of their children over ones of adults, files with the user's children, as determined by facial recognition techniques, may be deemed inappropriate as a carrier file. If the user is known to value adult relatives in the file over adult friends in the file, the latter may be chosen as a carrier file over the former.

In embodiments where the steganography engine uses a scoring system to grade the candidates for carrier files, the files with no humans may receive a higher score (indicating more suitability for being used as a carrier file), and the files with human faces may receive a lower score. In some embodiments, the value of the score may be correlated with the number of humans in the file as well. For example, if an image has multiple human faces, it may receive a lower score than if it had just one human face. If the score is below a predefined threshold (e.g., less than 5 on a scale of 1-10), then the steganography engine may deem the image file not suitable for being used as a carrier file.

The steganography engine may also keep track of the locations of the human faces appearing in the image files, so that if the image file ends up being used as a carrier file, the steganography technique will be applied to portions (e.g., different locations) of the image where humans are not shown. In this manner, even if steganography alters the visual appearance in certain locations of the image, the visual appearance alteration is more likely to be done to inanimate objects (or other animals) instead of humans, and thus it is less likely to annoy the user.

For video files, a plurality of sample points may be taken across the length of the video (e.g., 10 samples per minute, or 1 sample per second) to determine the number of humans in the video file. Again, the more humans appear in the video file, the lower the score (indicating that the file has a low suitability for being a carrier file) the video file may receive. If the score is below a predefined threshold (e.g., less than 5 on a scale of 1-10), then the steganography engine may deem the video file not suitable for being used as a carrier file.

The steganography engine may also keep track of the human faces appearing at each of the samples taken, so that if the video file ends up being used as a carrier file, the steganography technique will be applied to portions (e.g., different time periods) of the video where humans are not shown. In this manner, even if steganography alters the visual appearance in certain segments of the video, the visual appearance alteration is more likely to be done to inanimate objects (or animals) instead of humans, and thus it is less likely to annoy the user.

It is also understood that in some embodiments, the steganography engine may receive an input from the user 60, where the input designates one or more persons as persons of interest. For example, the user 60 may designate himself/ herself, and members of the user 60's friends or family as humans of interest. The user 60 may be more interested in keeping the visual appearance of the humans of interest intact. In these embodiments, the steganography will apply the human detection discussed above for image files and video files only for the humans of interest, rather than just all people in general.

In embodiments where the scanned file is an audio file, such as MP3 files, WAV files, etc., the attribute may include an amount (e.g., a percentage of total audio recording time) of the audio file that is either silence or noise. If the audio content contains not much silence or noise, then the audio file may be deemed not suitable (or less suitable) for being used as a carrier file. On the other hand, if the audio content contains a great deal of silence and/or noise, then the audio file may be deemed suitable (or more suitable) for being used as a carrier file. The rationale may be that most users value meaningful sounds (e.g., speech or music) in audio recordings, rather than silence or noise. Since a carrier file being used for steganography will undergo some degree of alteration, it is more desirable to use files that are not highly valued by the user as the carrier files. Accordingly, the files where the audio content contains a lot of silence or noise may be better candidates for being used as carrier files.

In embodiments where the steganography engine uses a scoring system to grade the candidates for carrier files, the files with a higher percentage of the audio recording as silence or noise may receive a higher score (indicating more suitability for being used as a carrier file), and the files with a lower percentage of the audio recording as silence or noise may receive a lower score. If the score is below a predefined threshold (e.g., less than 5 on a scale of 1-10), then the steganography engine may deem the audio file not suitable for being used as a carrier file.

The steganography engine may take a plurality of sample points across the length of the audio recording (e.g., 10 samples per minute, or 1 sample per second) to determine the degree of silence or noise in the audio recording. This information may be kept by the steganography engine, so that if the audio file ends up being used as a carrier file, the steganography technique will be applied to segments of the audio recording corresponding to silence or noise. In this manner, even if steganography alters the audible appearance in certain segments of the audio recording, the alteration is more likely to be done to segments that the user does not care much about, and thus it is less likely to annoy the user.

Thus, files are selected as carrier files based on the value a user may place on a file or how much a file may be changed with steganography. While the above provides some examples, other ways of making such determinations are also suitable, including user designations, location where file was generated (e.g., honeymoon, vacation, anniversary), time of year (e.g., Christmas), number files of similar captured content, or other indications that altering a first file using steganography may be more acceptable to a user than altering a second file.

Still referring to FIG. 4, the method 300 further includes a decision step 330 to determine whether a sufficient number of files in the electronic device been searched. In some embodiments, the sufficient number means every file in the electronic device (or in the specified directory/folder). In other embodiments, the sufficient number may be an absolute number in terms of quantity (e.g., 1000 files), or in terms of percentage (e.g., 75% of the total number of files). If the answer from the decision step 330 is no, then the method 300 loops back to step 320 again to continue the search for suitable carrier files. If the answer from the decision step 330 is yes, then the method 300 proceeds to another decision step 340 to determine whether a different electronic device (or a different directory/folder on the same electronic device) should be searched. If the answer from the decision step 340 is no, then the method 300 loops back to step 310 to look for a different electronic device (or different directory/folder) to do the searching discussed above. If the answer from the decision step 340 is yes, then the method 300 proceeds to a step 350 to finish the process for searching for suitable carrier files. The table of contents discussed above may also be updated accordingly. In other words, the updated table of contents will know which files (and their corresponding locations) will be suitable carrier files for steganography.

Figure 5:
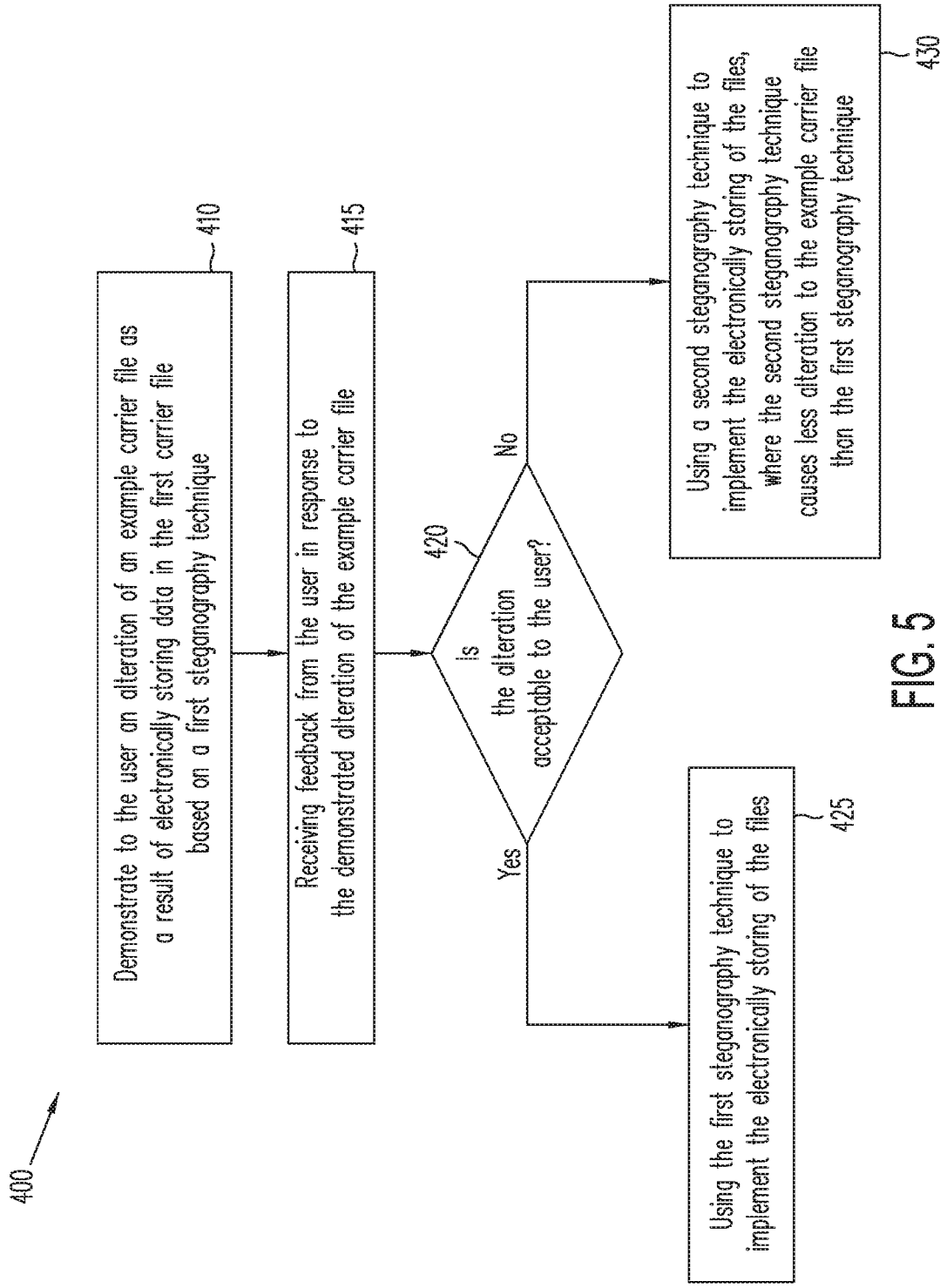

In some embodiments, the present disclosure may also perform a "calibration" for each user 60 to gauge the user's tolerance for the amount of alteration caused by steganography. This will then allow the steganography engine to fine tune its "aggressiveness" in performing the steganography. In more detail, referring now to FIG. 5, a flowchart of a method 400 of performing a calibration according to the present disclosure is illustrated. The method 400 includes a step 410, in which a demonstration is shown to the user 60 with respect to the alteration of an example carrier file as a result of electronically storing data in the example carrier file based on a first steganography technique. For example, the first steganography technique may be the LSB technique discussed above, and the carrier file may be an image file. As a part of the demonstration, an original version of the image file and an altered version (e.g., altered after the LSB technique is applied to store information therein) of the image file are both presented to the user. In some embodiments, the "before" and "after" images may be presented side-by-side, so that the user can more clearly see what is the extent of the change in the visual appearance of the image file as a result of the application of the LSB steganography technique.

The method 400 then proceeds to step 415, in which feedback from the user is received in response to the demonstrated alteration of the example carrier file in step 410. The feedback may include the user clicking an "acceptable" button or an "unacceptable" button through a user interface, or it may include the user assigning a satisfaction score through the user interface. The received feedback indicates whether (or to what extent) the user is okay with the degree of alteration to the example carrier file caused by the first steganography technique (e.g., the LSB technique in this example) herein.

The method 400 then proceeds to a decision step 420 to determine whether the alteration is acceptable to the user, based on the input received from the step 415. If the answer from the decision step 420 is yes, then the method 400 proceeds to a step 425, where the first steganography technique may be used to implement the electronic storing of the source files. However, if the answer from the decision step 420 is no, then the method 400 proceeds to a step 430, where a second steganography technique may be used to implement the electronic storing of the source files. The second steganography technique is different from the first steganography technique and causes less alteration to the example carrier file than the first steganography technique. For example, the second steganography technique may not utilize the least significant bit of every single pixel of the example carrier file to store the information of the source file, but rather a subset of the pixels (e.g., every other pixel, or every third pixel). Since fewer pixels are altered, the overall alteration to the image may be less significant and thus more acceptable to the user. In other words, the second steganography technique is less aggressive than the first steganography technique.

It is understood that additional steps may be performed as a part of the method 400. For example, if the user is okay or agreeable with the alteration to the image file due to the first steganography technique, the method 400 may now turn to a third steganography technique that is more aggressive than the first steganography technique. For example, the third steganography technique may involve using the least two significant bits (e.g., the last two bits of a binary digit), rather than just one bit, in order to store the information of the source file. The "before" and "after" versions of the example carrier file image are then shown to the user again, and user feedback is received, similar to steps 410-415. If the user is agreeable with the amount of alteration caused by the third steganography technique, then either the third steganography technique will be used to implement the electronic storing discussed above, or a fourth steganography technique that is even more aggressive than the third steganography technique will be used to repeat the steps 410 and 415 again.

Similarly, if the user indicated that the amount of alteration caused by the second steganography technique is still not acceptable, then progressively less aggressive steganography techniques may be performed to the example carrier file to determine at what level the user is comfortable with the amount of alteration. In this manner, a suitably aggressive steganography technique will be determined in a customized manner for each individual user. This will optimize the performance of the electronic storing of files while not causing user dissatisfaction. Of course, the "calibration" process discussed herein is not limited to using carrier files with visual content, since carrier files with audio content or textual content may also be used to run the calibration discussed above.

Figure 6:
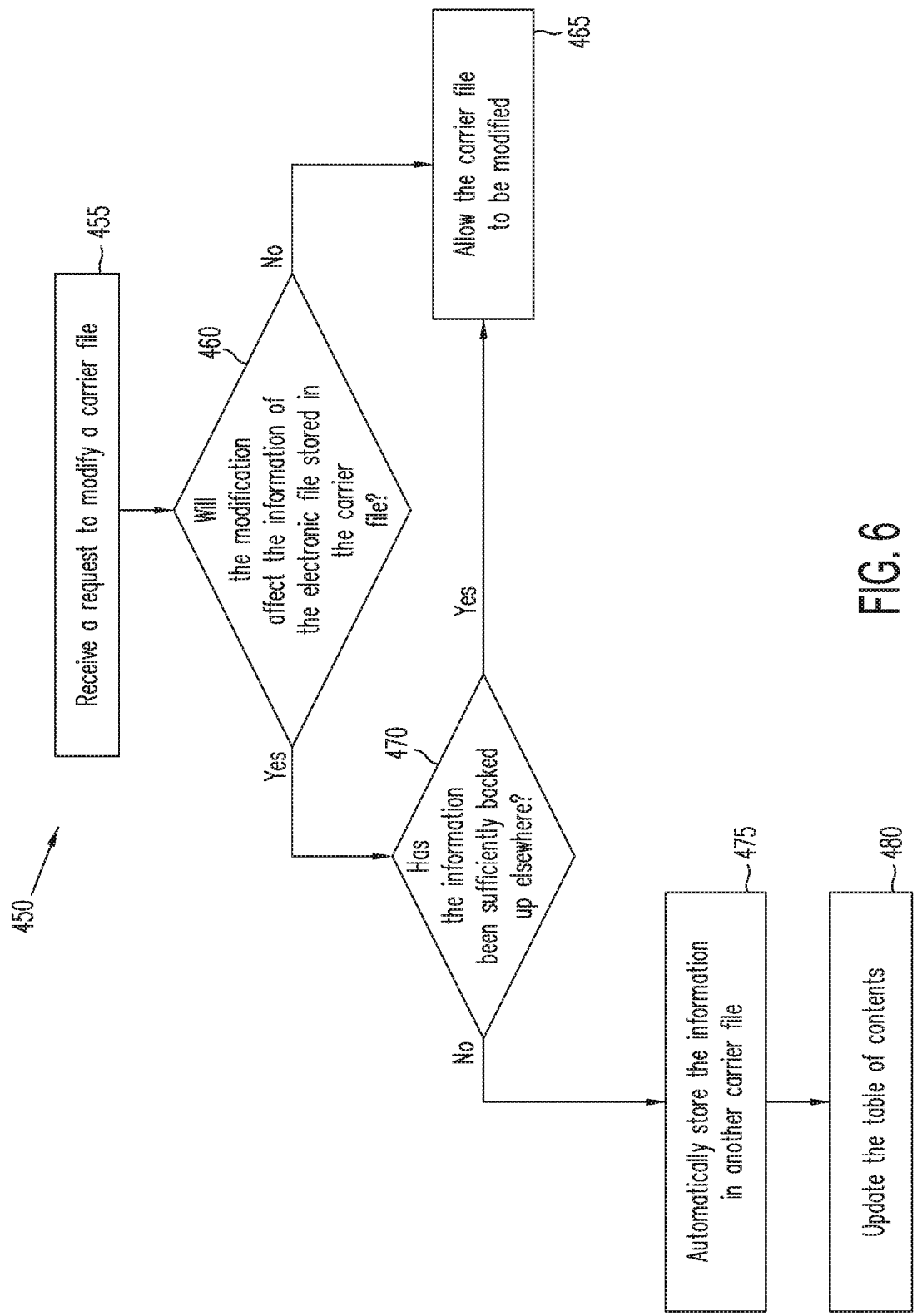

Referring now to FIG. 6, a flowchart of a method 450 is illustrated. The method 450 describes an example process flow to prevent the accidental deletion or corruption of the information of the source file that is stored in carrier files. The method 450 includes a step 455, in which a request is received to modify a carrier file. The request may come from the user 60, or it may come from one of the programs running on the electronic device on which the carrier file resides. In some embodiments, the request to modify the carrier file involves a request to write additional data to the carrier file, or to change the existing data of the carrier file. In other embodiments, the request to modify the carrier file may include a request to delete the carrier file altogether.

The method 450 then proceeds to a decision step 460 to determine whether the modification of step 455 will affect the information of the source file that is stored in the carrier file via steganography according to the aspects of the present disclosure discussed above. If the modification will not affect the stored information of the source file, then the method 450 proceeds to a step 465, in which the carrier file is allowed to be modified. However, if the decision step 460 determines that the modification will affect the information of the source file stored in the carrier file (e.g., if the modification is a deletion request or will overwrite the information of the source file), the method 450 proceeds to another decision step 470 to determine whether the information has been sufficiently backed up elsewhere. For example, the information stored in the carrier file may have been backed up according to the local and/or global redundancy methods discussed above. In other words, multiple copies of the information of the source file may already be stored in other carrier files on the same electronic device, or on other electronic devices.

In some embodiments, the decision step 470 involves comparing the number of redundant copies of the information stored elsewhere against a predefined threshold, and the information of the source file will be deemed to have been sufficiently backed up if the number of redundant copies meets or exceeds the predefined threshold. As an example, suppose that the predefined threshold is 5, and 10 copies of the source file have been determined to be stored in carrier files other than the carrier file that is to be modified. In that case, the decision step 470 will determine that the source file has been sufficiently backed up, and the method 450 will proceed to the step 465 to allow the carrier file to be modified.

On the other hand, suppose the number of copies of the information is less than 5 (e.g., 3, or even 0), then the decision step 470 will determine that the source file has not been sufficiently backed up, and the method 450 will proceed to a step 475 to automatically store the source file in another carrier file, using the steganography techniques discussed herein. The method 450 will also perform a step 480 to update the table of contents, so that the steganography engine can accurately keep track of the most recent location(s) of the source file that is stored in one or more carrier files. In this manner, the method 450 will prevent inadvertent modification or deletion of source file information that should be stored. It is understood that in some embodiments, the steps 455-480 may be executed without the user's specific involvement or awareness that they are being performed.

Figure 7:
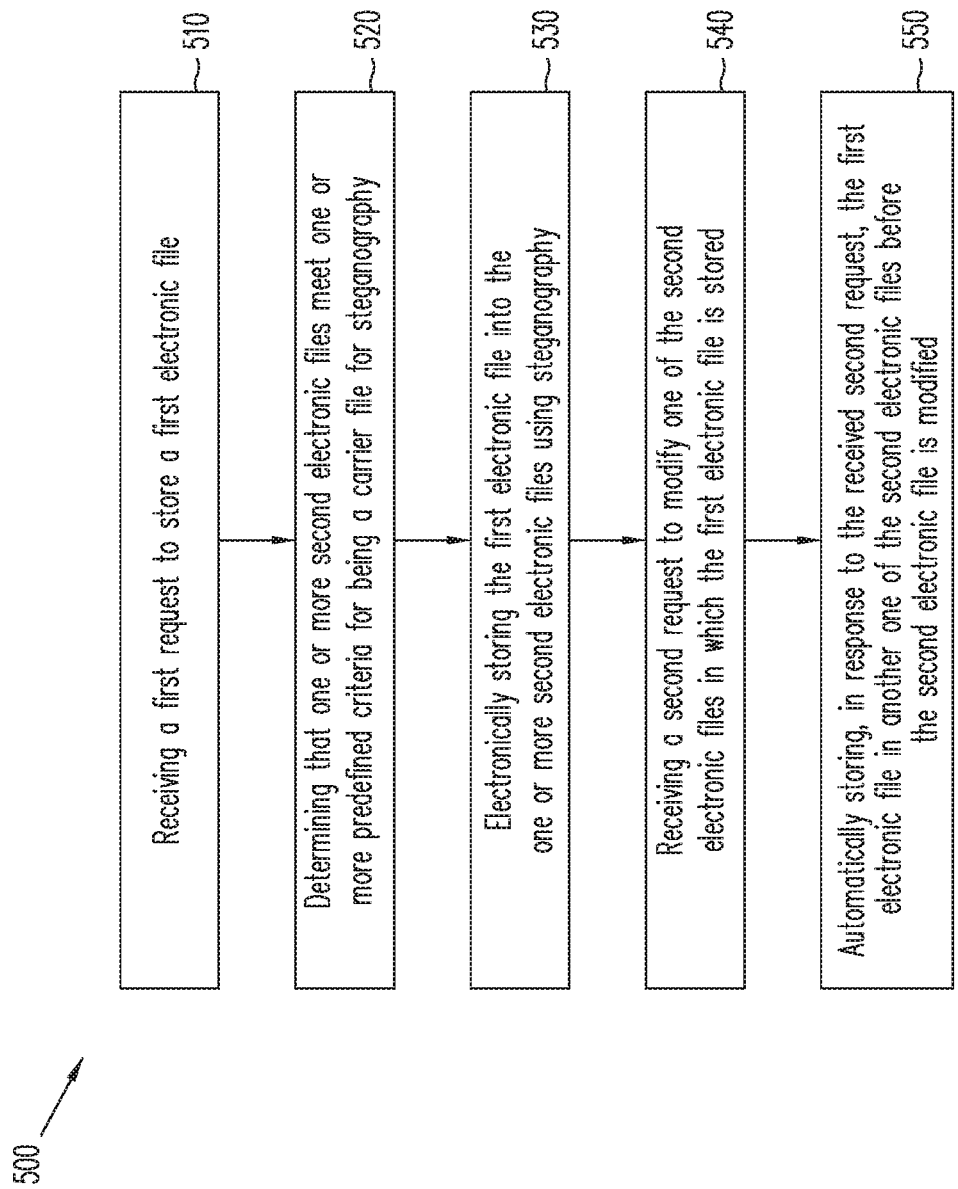

FIG. 7 is a flowchart illustrating a method 500 for leveraging steganography to back up electronic files. The method 500 includes a step 510, in which a first request to store a first electronic file is received.

The method 500 includes a step 520 of determining that one or more second electronic files meet one or more predefined criteria for being a carrier file for steganography. In some embodiments, the determining comprises determining whether a rate at which the one or more second electronic files are electronically modified is below a predefined rate. In some embodiments, the one or more second electronic files include visual content, and the determining comprises determining whether a human presence in the visual content is below a predefined threshold. In some embodiments, a designation is received from the user of one or more humans as humans of interest, wherein the determining step comprises determining a presence of the designated humans of interest in the visual content. In some embodiments, in response to determining that the one or more second electronic files are suitable for being used as carrier files, steganography is performed only to portions of the one or more second electronic files that do not correspond to the human presence in the visual content. In some embodiments, the one or more second electronic files include audio content, and the determining step comprises determining whether an amount of silence or background noise in the audio content is above a predefined threshold. In some embodiments, in response to determining that the one or more second electronic files are suitable for being used as carrier files, steganography is performed only to portions of the one or more second electronic files that correspond to the silence or the noise in the audio content.

The method 500 includes a step 530 of electronically storing the first electronic file into the one or more second electronic files using steganography. In some embodiments, the one or more second electronic files are located in a plurality of different electronic media, and the electronically storing step comprises dividing the first electronic files into a plurality of portions and electronically storing the plurality of portions into the different electronic media.

The method 500 includes a step 540 of receiving a second request to modify one of the second electronic files in which the first electronic file is stored.

The method 500 includes a step 550 of automatically storing, in response to the received second request, the first electronic file in another one of the second electronic files before the second electronic file is modified.

It is understood that additional method steps may be performed before, during, or after the steps 510-550 discussed above. For example, in some embodiments, the method 500 may include a step of demonstrating, to a user, an alteration of an example carrier file as a result of electronically storing data in the example carrier file based on a first steganography technique. The method 500 may further include a step of receiving feedback from the user in response to the demonstrating, the feedback indicating whether the alteration of the example carrier file is acceptable to the user. In some embodiments, the method 500 may include a step of using the first steganography technique to implement the electronically storing in response to the feedback indicating that the alteration of the example carrier file is acceptable to the user, or using a second steganography technique to implement the electronically storing in response to the feedback indicating that the alteration of the example carrier file is unacceptable to the user, wherein the second steganography technique causes less alteration to the example carrier file than the first steganography technique.

Based on the above discussions, it can be seen that the present disclosure offers several significant advantages over conventional electronic data storing. It is understood, however, that not all advantages are necessarily discussed in detail herein, different embodiments may offer different advantages, and that no particular advantage is required for all embodiments. One advantage is that by leveraging steganography and the existing files on an electronic device to store data, the present disclosure offers additional data storage space at no additional cost. This makes electronic data storage more efficient and less costly. Another advantage is that by offering different levels of redundancy to store the data electronically, the present disclosure improves the security and safety of the stored data. For example, if an important document is stored according to the steganography methods discussed herein, and with redundancy, then even if one carrier file for the document becomes corrupted, lost, deleted, or subject to ransomware, the user may still retrieve another backup copy from another carrier file. Other advantages may include compatibility with existing systems and low cost of implementation.

Figure 8:
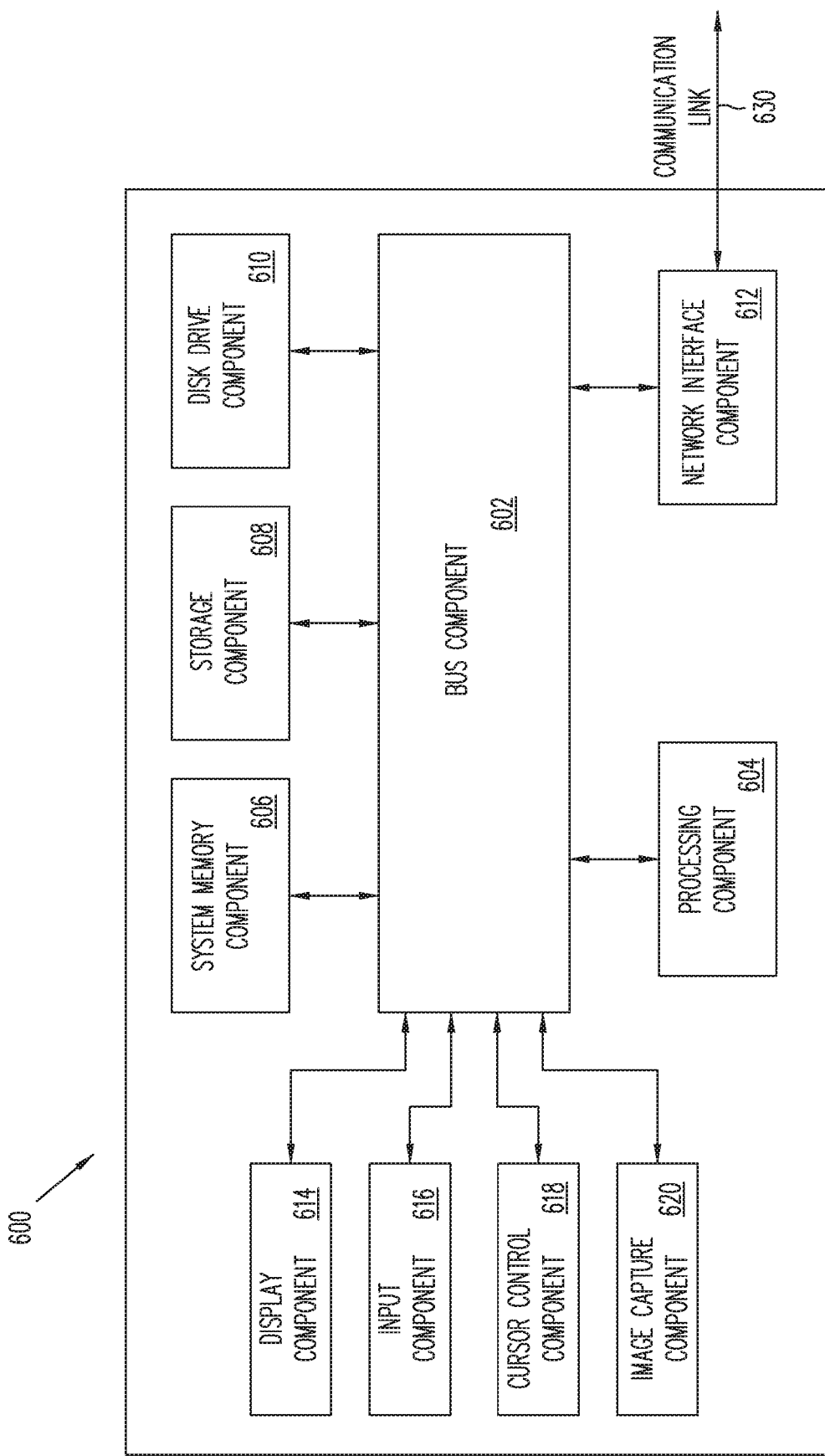
FIG. 8 is an example computer system for implementing the various steps of the methods of FIGS. 3-7 according to various aspects of the present disclosure.

FIG. 8 is a block diagram of a computer system 600 suitable for implementing various methods and devices described herein, for example, the various method steps of the methods 200, 300, 400, 450, and 500. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the method 200, 300, 400, 450, and 500 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 9:
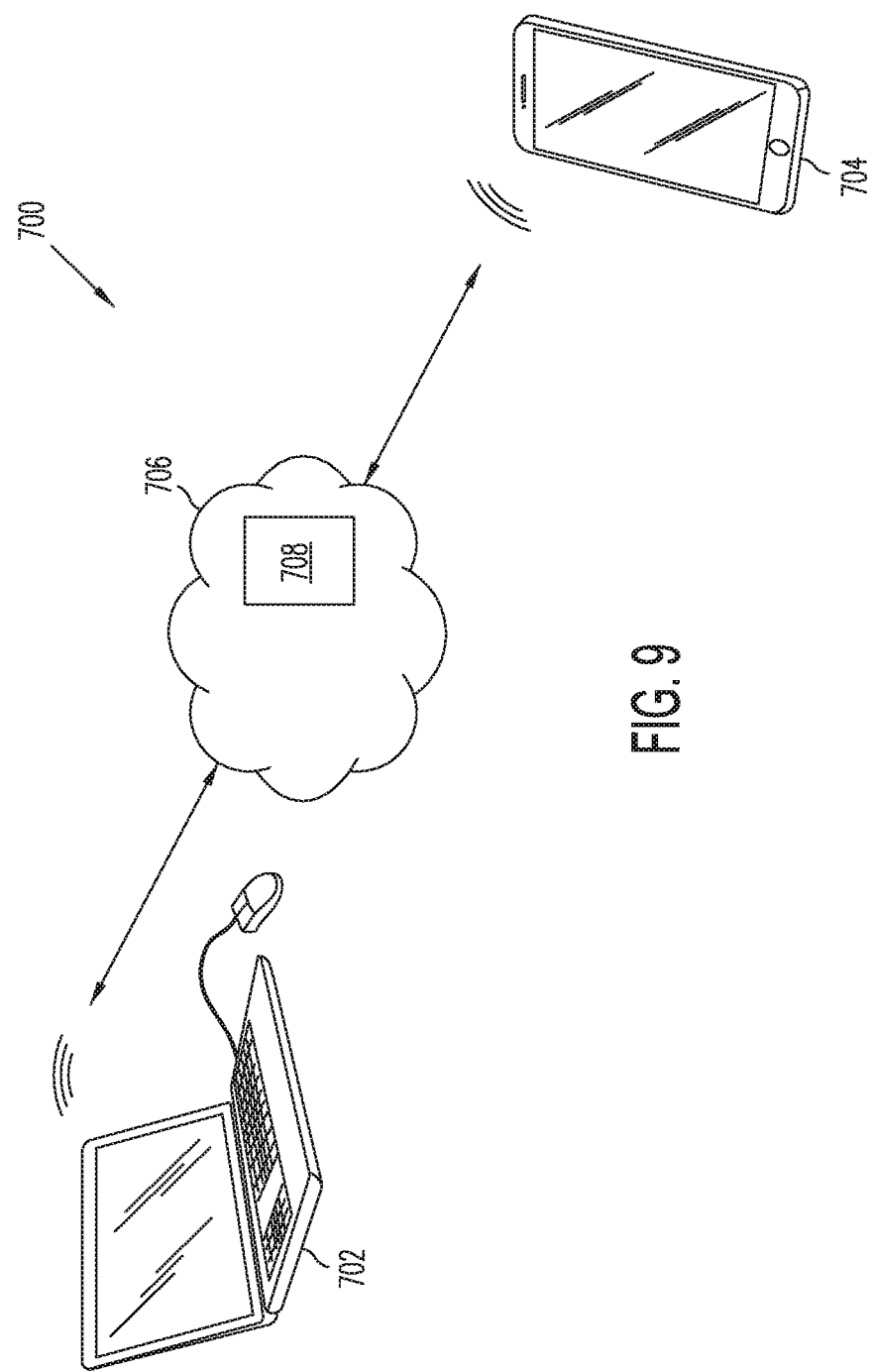
FIG. 9 is a simplified example of a cloud-based computing architecture according to various aspects of the present disclosure.

FIG. 9 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an app with functionalities described above with reference to FIGS. 1-8.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method. The method includes: receiving a first request to store a first electronic file; determining that one or more second electronic files meet one or more predefined criteria for being a carrier file for steganography; and electronically storing the first electronic file into the one or more second electronic files using steganography.

One aspect of the present disclosure involves a system. The system includes a non-transitory memory and one or more hardware processors coupled to the non-transitory memory and configured to read instructions from the non-transitory memory to cause the system to perform operations comprising: receiving a first request to store a first electronic file; determining whether a second electronic file meets a predefined criterion for being a carrier file for steganography; electronically storing, in response to a determination that the second electronic file meets the predefined criterion, information corresponding to at least a portion of the first electronic file into the second electronic files via steganography; receiving, after the electronically storing, a second request to modify the second electronic file; determining whether a modification of the second electronic file according to the second request would affect the information stored therein via steganography; and automatically storing, in response a determination that the modification of the second electronic file would affect the information stored therein via steganography, the first electronic file in a third electronic file before the second electronic file is modified.

Yet another aspect of the present disclosure involves a non-transitory machine-readable medium having stored thereon machine-readable instructions executable to cause a machine to perform operations comprising: receiving a first request to store a first electronic file; determining whether a second electronic file meets one or more predefined criteria for being a carrier file for steganography, wherein the second electronic file contains visual content or audio content, and wherein the one or more predefined criteria includes a frequency at which the second electronic file is modified, a human presence in the visual content, or an amount of silence or noise in the audio content; electronically storing, in response to a determination that the second electronic file meets the one or more predefined criteria, information corresponding to at least a portion of the first electronic file into the second electronic files via steganography; receiving, after the electronically storing, a second request to modify the second electronic file; determining whether a modification of the second electronic file according to the second request would affect the information stored therein via steganography; and automatically storing, in response a determination that the modification of the second electronic file would affect the information stored therein via steganography, the first electronic file in a third electronic file before the second electronic file is modified.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    receiving a first request to store a first electronic file;
    determining that a second electronic file meets a predefined criterion for being a carrier file for steganography;
    electronically storing information corresponding to at least a portion of the first electronic file into the second electronic the using steganography;
    receiving a second request to modify the second electronic file in which the first electronic file is stored;
    determining whether a modification of the second electronic file according to the second request would affect the information stored therein via steganography; and
    automatically storing, in response to the received second request, the first electronic file in a third electronic file before the second electronic file is modified.

2. The method of claim 1, wherein the determining that the second electronic file meets the predefined criterion comprises: determining whether a rate at which the second electronic file is electronically modified is below a predefined rate.

3. The method of claim 1, wherein:
    the second electronic file includes visual content; and
    the determining that the second electronic file meets the redefined criterion comprises determining whether a human presence in the visual content is below a predefined threshold.

4. The method of claim 3, further comprising:
    receiving, from a user, a designation of one or more humans as humans of interest,
    wherein the determining that the second electronic file meets the predefined criterion determining a presence of the designated one or more humans of interest in the visual content.

5. The method of claim 3, further comprising; in response to the determining that the second electronic file meets the predefined criterion, performing steganography only to portions of the second electronic file that do not correspond to the human presence.

6. The method of claim 1, wherein:
    the second electronic file includes audio content; and
    the determining that the second electronic file meets the predefined criterion comprises determining whether an amount of silence or noise in the audio content is above a predefined threshold.

7. The method of claim 6, further comprising:
    in response to the determining that the second electronic file meets the predefined criterion, performing steganography only to portions of the second electronic file that correspond to the silence or the noise.

8. The method of claim 1, wherein: the second electronic file is located in a plurality of different electronic media; and the electronically storing comprises dividing the first electronic file into a plurality of portions and electronically storing the plurality of portions into the different electronic media.

9. The method of claim 1, further comprising:
    demonstrating, to a user, an alteration of an example carrier file as a result of electronically storing data in the example carrier file based on a first steganography technique; and
    receiving feedback from the user in response to the demonstrating.

10. The method of claim 9, further comprising; using the first steganography technique to implement the electronically storing in response to the feedback being a first type of feedback; or
    using a second steganography technique to implement the electronically storing in response to the feedback being a second type of feedback different from the first type,
    wherein the second steganography technique causes less alteration to the example carrier file than the first steganography technique.

11. A system, comprising:
    a non-transitory memory; and one or more hardware processors coupled to the non-transitory memory and configured to read instructions from the non-transitory memory to cause the system to perform operations comprising:
    receiving a first request to store a first electronic file;
    determining whether a second electronic file meets a predefined criterion for being a carrier the for steganography;
    electronically storing, in response to a determination that the second electronic file meets the predefined criterion, information corresponding to at least a portion of the first electronic file into the second electronic files via steganography;
    receiving, after the electronically storing, a second request to modify the second electronic file;

determining whether a modification of the second electronic file according to the second request would affect the information stored therein via steganography; and automatically storing, in response to a determination that the modification of the second electronic file would affect the information stored therein via steganography, the first electronic file in a third electronic file before the second electronic the is modified.

12. The system of claim 11, wherein the determining whether the second electronic file meets the predefined criterion comprises: determining whether a rate at which the second electronic the is electronically modified is below a predefined rate.

13. The system of claim 11, wherein:
the second electronic file includes visual content; and
the determining whether the second electronic file meets the predefined criterion comprises determining whether a human presence in the visual content is below a predefined threshold.

14. The system of claim 13, wherein the operations further comprise: in response to determining that the second electronic file meets the predefined criterion, performing steganography only to portions of the second electronic file that do not correspond to the human presence.

15. The system of claim 11, wherein:
the second electronic file includes audio content; and
the determining whether the second electronic file meets the predefined criterion comprises determining whether an amount of silence or noise in the audio content is above a predefined threshold.

16. The system of claim 15, further comprising: in response to determining that the second electronic meets the predefined criterion, performing steganography only to portions of the second electronic file that correspond to the silence or the noise.

17. The system of claim 11, wherein:
the second electronic file is located in a first electronic device; and
the third electronic file is located in a second electronic device different from the first electronic device.

18. The system of claim 11, wherein the operations further comprise: demonstrating, to a user, an alteration of an example carrier file as a result of electronically storing data in the example carrier file using steganography; and receiving feedback from the user in response to the demonstrating; and
adjusting an aggressiveness level of the steganography based on the received feedback.

19. A non-transitory machine-readable medium having stored thereon machine-readable instructions executable to cause a machine to perform operations comprising:
receiving a first request to store a first electronic file;
determining whether a second electronic file meets one or more predefined criteria for being a carrier file for steganography, wherein the second electronic file contains visual content or audio content, and wherein the predefined criteria includes a frequency at which the second electronic file is modified, a human presence in the visual content, or an amount of silence or noise in the audio content;
electronically storing, in response to a determination that the second electronic file meets the one or more predefined criteria, information corresponding to at least a portion of the first electronic file into the second electronic files via steganography;
receiving, after the electronically storing, a second request to modify the second electronic file;
determining whether a modification of the second electronic file according to the second request would affect the information stored therein via steganography; and
automatically storing, in response to a determination that the modification of the second electronic file would affect the information stored therein via steganography, the first electronic tile in a third electronic file before the second electronic file is modified.

20. The non-transitory machine-readable medium of claim 19, wherein:
the second electronic file is located in a plurality of different electronic media; and
the electronically storing comprises dividing the first electronic file into a plurality of portions and electronically storing the plurality of portions into the different electronic media.

* * * * *